United States Patent
Stucki et al.

(10) Patent No.: US 8,798,531 B2
(45) Date of Patent: Aug. 5, 2014

(54) SYSTEM AND PORTABLE DEVICE FOR TRANSMITTING IDENTIFICATION SIGNALS

(75) Inventors: Andreas Stucki, Grut (CH); Andreas Haberli, Bubikon (CH)

(73) Assignee: KABA AG, Wetzikon (CH)

( * ) Notice: Subject to any disclaimer, the term of this patent is extended or adjusted under 35 U.S.C. 154(b) by 842 days.

(21) Appl. No.: 12/526,882

(22) PCT Filed: Feb. 14, 2008

(86) PCT No.: PCT/CH2008/000059
§ 371 (c)(1), (2), (4) Date: Oct. 12, 2009

(87) PCT Pub. No.: WO2008/098399
PCT Pub. Date: Aug. 21, 2008

(65) Prior Publication Data
US 2010/0048127 A1      Feb. 25, 2010

(30) Foreign Application Priority Data

Feb. 14, 2007 (CH) .......................... 240/07

(51) Int. Cl.
*H04B 5/00* (2006.01)
(52) U.S. Cl.
USPC ....................................... 455/41.1
(58) Field of Classification Search
CPC ................... H04B 13/005; G07C 2009/00809; G06F 9/323
USPC ....................................... 455/41.1
See application file for complete search history.

(56) References Cited

U.S. PATENT DOCUMENTS

| 4,591,854 | A | | 5/1986 | Robinson |
| 5,721,783 | A | * | 2/1998 | Anderson ...................... 381/328 |
| 5,796,827 | A | | 8/1998 | Coppersmith et al. |
| 5,914,701 | A | * | 6/1999 | Gersheneld et al. .......... 345/156 |
| 5,999,561 | A | * | 12/1999 | Naden et al. ................... 375/142 |
| 6,336,031 | B1 | * | 1/2002 | Schyndel ..................... 455/41.2 |

(Continued)

FOREIGN PATENT DOCUMENTS

| EP | 1168678 | | 1/2002 | |
| EP | 1168678 A1 | * | 1/2002 | ............. H04B 10/13 |

(Continued)

*Primary Examiner* — Yuwen Pan
*Assistant Examiner* — Ayodeji Ayotunde
(74) *Attorney, Agent, or Firm* — Rankin, Hill & Clark LLP

(57) ABSTRACT

A system is provided with a portable device (31) for the transmission of signals to a second device, wherein the portable device (31) is wearable on the body of a user. The portable device (31) includes at least two electrodes (3, 4) and transmitter electronics (7) for applying an electrical signal between the electrodes, in such a way that the signal between the electrodes (3, 4) is able to be coupled into the body of the user and detected by at least one electrode of the second device. The transmitter electronics are an application specific integrated circuit and thus include both means for the production of electrical signals that are dependent upon specified data, as well as means for applying the electrical signal between the electrodes. The means for generating electrical signals that are dependent upon specified data are typically digital circuits for the encoding of specified data that are to be transmitted and for the modulation of the data that are so encoded.

18 Claims, 4 Drawing Sheets

(56) References Cited

U.S. PATENT DOCUMENTS

| | | |
|---|---|---|
| 2001/0033562 A1* | 10/2001 | Schilling .................. 370/342 |
| 2004/0015058 A1* | 1/2004 | Besson et al. ............. 600/301 |
| 2004/0189603 A1* | 9/2004 | Arrigo et al. ............. 345/158 |
| 2005/0235354 A1* | 10/2005 | Griesdorf et al. ............ 726/17 |
| 2006/0256798 A1* | 11/2006 | Quick et al. ............... 370/401 |
| 2007/0030213 A1* | 2/2007 | Ito ............................ 345/60 |
| 2008/0104435 A1* | 5/2008 | Pernia et al. .............. 713/322 |
| 2009/0149212 A1 | 6/2009 | Kano |

FOREIGN PATENT DOCUMENTS

| | | |
|---|---|---|
| JP | 2002-9710 | 1/2002 |
| JP | 2005-159684 | 6/2005 |
| JP | 2005-303571 | 10/2005 |
| JP | 2005-341312 | 12/2005 |
| JP | 2007-036500 | 2/2007 |
| WO | 2006/054706 A1 | 5/2006 |
| WO | 2007/036061 | 4/2007 |
| WO | 2007/112609 | 10/2007 |

* cited by examiner

SYSTEM AND PORTABLE DEVICE FOR TRANSMITTING IDENTIFICATION SIGNALS

BACKGROUND OF THE INVENTION

1. Field of the Invention

The invention relates to the communication between a sender (transmitter) and a receiver over a capacitive coupling (sometimes also referred to as capacitive resistive coupling, "intrabody" coupling or PAN-coupling) in which small electrical currents which are used for the transmission of information between the transmitter and the receiver are produced in the human body, and/or in which the transmitter and the receiver interact with one another over very short distances via electric fields.

2. Description of Related Art

This method of coupling is disclosed in the U.S. Pat. Nos. 4,591,854, 5,914,701 and 5,796,827. Implementations thereof are described in the international patent application PCT/CH 2006/000518 as well as in further published specifications of various bearers.

A particular advantage of the capacitive coupling through the human body or, as the case may be, over short distances is the selectivity of the data transmission. Depending on the configuration, one can determine with a high degree of certainty that the signal received by the receiver can only have been transmitted by the person who is situated in direct proximity to or in physical contact with a receiver electrode that is designated for it.

A disadvantage is, among other things, that as a result of the poor signal to noise ratio (literally: signal-interference ratio), only a small amount of data can be transmitted. A good signal to noise ratio is only possible with a large amplitude of the transmission signal. However, a large amplitude (i.e. high voltage) would not be tolerated by the user. In the international patent publication WO 2007/112609 approaches are described with which these problems can be addressed. Despite these the bandwidth of the signal transmission remains limited.

Many possible applications exist for capacitive resistive data transmission, however known realizations are tailored to particular applications. For a new application, a newly adapted hardware, which is adapted to the specific requirements corresponding to the particular signal to be transmitted and to the physical factors, must be developed. This situation is unsatisfactory.

With this background in mind, it is an object of the present invention to provide solutions for capacitive resistive data transmission which ameliorate the above-mentioned disadvantages at least partly and which mean a further step toward the commercial application of the technology and its acceptance by consumers. The solutions mentioned should, in particular, be utilizable for access control.

BRIEF SUMMARY OF THE INVENTION

These objects will be fulfilled by the invention, as it is described in the patent claims.

A portable device according to the approach according to the invention is, for example, wearable on the body of a user; it can be designed as a card-like identification medium, as "smart card cover", mobile telephone, watch, portable computer (for example of the "handheld computer" type) etc. It includes at least two electrodes and means for the generation of an electrical signal between the electrodes, such that the signal is able to be coupled through the electrodes to the body of the user and is detectable from the body by at least one electrode of a second device. Such a device also makes possible a direct, short-range communication (not through the body), for example through holding of the portable device in direct proximity of a receiver electrode, i.e. applications of the invention are not limited to coupling through the human body but rather also extend to cases in which the user carries the portable device on his or her person, holds it in the vicinity of a receiver electrode or otherwise makes it possible that the communication between transmitter and receiver takes place directly and not exclusively over the body.

Therein, according to an aspect of the invention, the mentioned means for the generation of electrical signals between the electrodes are a part of transmitter electronics, wherein the transmitter electronics include means for the production of electrical signals that are dependent upon specified data, and the transmitter electronics are executed as an application-specific integrated circuit (ASIC).

The transmitter electronics or rather the ASIC, thus, include means for the production of electrical signals dependent upon specified data as well as means for the generation of electrical signals between the electrodes. The means for the production of electrical signals that are dependent upon specified data are typically digital circuitry for the encoding of specified data to be transmitted and for the modulation of the data so encoded. The means for generation of electrical signals between the electrodes are power or amplification circuits that contribute the necessary power to drive the electrodes. As both the digital processing elements and the drivers are present on a single integrated circuit, a flexible and efficiently applicable component part results.

Furthermore, the example of the transmitter electronics with ASIC has proven advantages with respect to a reduction of power consumption. In particular, in contrast to a microprocessor that is not application specific and available on the market, the ASIC for the capacitive resistive coupling with the method described here does not need to comprise high-frequency oscillations since all signals are low-frequency. Also, the query of unused inputs, which further contributes to the background power consumption of microprocessors, ceases to apply. Through the approach according to the invention, particularly in combination with a low-frequency transmission (center frequency lower than 2 MHz) and ultra-broadband signal transmission, the background power consumption can be reduced by a factor of 100 to 1000 in comparison to the state of the art.

The specified and to-be-transmitted data are in a further preferred embodiment of the invention themselves stored or, as the case may be, storable in the transmitter electronics. To this end the portable device contains a data memory, for example in a volatile or preferably non-volatile memory such as an EEPROM. Therewith the transmitter electronics, without further component parts (along with a battery and electrodes), can be used for the sending-out of identification signals. Thus, the transmitter electronics can be integrated into keys, smart cards, card holders, etc. of an access control system. The data to be transmitted, thus, correspond to a code or key. For applications in which the code does not need to be changed, it can also be stored in a memory that can not be overwritten.

In another preferred embodiment of the invention, the transmitter electronics include an interface for communication with a further unit (or application), which is built into the portable device or communicates with the portable device through the interface. Over a corresponding communications interface, in particular an I²C bus, the data that are to be transmitted are able to be conveyed from the other application to the transmitter electronics. The transmitter electronics are therein designed to that end to modulate, encode and send out these data or transmission data that are extracted from these data. The portable device therein preferably serves among other things as an input unit for the transmitter electronics.

The portable device can, for example, be an identification medium designed in a card shape, a "smart card cover"-like identification medium or an identification medium in another form, for example in the form of a key fob. As an alternative thereto, it can be a more 'intelligent' device with other functionalities, for example a mobile telephone or another "handheld" device such as a PDA (personal digital assistant), or a watch, etc. Modern electronic devices often have large displays. A first of the two sender (and/or receiver) electrodes can be arranged in or over the display. This has the advantage of a reduced capacitance, if the second—transparent or non transparent—electrode is for example arranged in the area of a back side of the device.

Other combinations of the two preferred embodiments are imaginable, i.e. the existence of both a, for example, non-volatile memory as well as the existence of an interface for communication with a, for example, portable device.

Preferably, the parameters of the encoding corresponding to the requirements of the communication security and speed are customizable. Furthermore, the driving circuit of the transmitter electronics is also capable of being parameterized, whereby it is customizable to different categories of electrodes. The signal bandwidth and the center frequency (carrier frequency) are potentially capable of being parameterized, in order to achieve the optimum with respect to robust data transmission in very noisy environments.

By making the transmitter electronics available as an integrated circuit with the functionality and ability to be parameterized as described above, a widely applicable element is created. This can, on the one hand, be furnished to be used as a "stand alone" with a battery, the electrodes, and a more or less complex—customized to the corresponding use—circuit. Therein, the data to be transmitted are themselves (non-volatilely) stored in the transmitter electronics. On the other hand the transmitter electronics can be as a part of the portable device with at least one other application, or at least be in intermittent connection with another application, supplied by this portable device over the communication interface with data to be sent, and preferably also controlled by it.

According to a preferred embodiment of the invention, two electrodes of a portable device (transmitter) are arranged such that between the electrodes there are arranged either component parts of another application distinct from the transmitter electronics, or an air gap is present, in which such a component part—for example with a "smart card" as the carrier of the part—can be inserted.

Of course the transmitter electronics and electronic component parts for the application which is distinct from the transmitter electronics may be integrated together with one another in at least one unified component—for example in an integrated circuit. According to the invention, the characteristic feature of the "component part of an application which is distinct from the transmitter electronics" is simply that between the electrodes there are arranged electronic elements which can administrate functions that are entirely distinct from the capacitive resistive information transmission and preferably from other contact-free information transmission methods, for example as they control or constitute the display of a mobile telephone, as they store information and/or have stored information which is not communicated with the capacitive resistive information transmission, etc.

According to a special embodiment of the invention, the portable device with the air gap can comprise a communications interface, over which data can be exchanged with the application that is able to be inserted into the air pocket. Such an interface can, for example, be formed like a conventional smart card reader.

According to a further special embodiment, a communication link can exist between the transmitter electronics and an input unit, wherein then the signals transmitted by the transmitter electronics can be dependent on data that are input. For example, the transmitted signal can include a PIN, which the user previously has input in the input unit. In this embodiment the portable device can, for example, be designed as a mobile telephone, wherein the input unit can correspond to the input unit of the mobile telephone (keypad, touchscreen, voice recognition device etc.).

As the portable device is a mobile telephone, the power supply for the transmitter electronics can be obtained by simple means: namely as the transmitter electronics are energized by the very powerful battery of the mobile telephone, for example over a 3V DC supply. The communication between the transmitter electronics and the remaining electronic component parts of the mobile telephone can be accomplished—in the case that these are not integrated with one another—over any known or yet to be developed interface, for example over a $I^2C$ data bus.

According to a further aspect of the invention, the transmitter electronics, by which the at least two electrodes of the transmitter are controlled, include a charge recovery logic and/or an adiabatic switching logic. The charge recovery logic can, for example, be based upon "synchronous rectification".

Charge recovery logics are well known for use in capacitances in integrated circuits, for example in slow CMOS or other integrated circuits.

Now it has been recognized that such a charge recovery logic is particularly advantageous for the control—in general not integrated in the control electronics—of electrodes of a portable device according to the invention. This new approach is an object of the realization that with comparatively low frequencies that are required for intrabody communication, a control of the electrodes by means of a charge recovery system is possible and advantageous. It allows a substantial savings in power consumption and consequently realizes a clear increase in the battery life of the (autonomous, i.e. not connected to an external power supply) portable device.

Subsequently, the power consumption of a portable device for the transmission of signals to a second device, wherein the portable device is wearable on the body of a user, comprising at least two electrodes and transmitter electronics for the generation of an electrical signal between the electrodes, so that the signal is able to be coupled through the electrodes into the body of the user and is detectable from the body by at least one electrode of the second device, will be discussed in more detail with reference to further aspects. It is assumed in each case that the transmitter electronics are powered by a battery (rechargeable or not rechargeable).

The following aspects of the invention can contribute further to a reduction of the power consumption. Each of the aspects can be employed singly, in combination with any of the other aspects, or in combination with any of the any of the previously described aspects:

Use of an activity detector (movement detector) which turns off, i.e. stops, the emission of the signal as soon as the portable device is not moved for a long period of time and reactivates the signal if the device is moved. Such activity detectors are known and available—at low price—in the market.

At least partial energizing of the transmitter electronics and/or charging of the battery by a solar cell and/or a generator, through which mechanical kinetic energy is converted into electrical energy.

Larger spacing between the electrodes of at least 1 mm, preferably at least 1.5 or at least 2 mm.

A feature for the activation of the transmitter electronics by an external signal, e.g. a RFID- or UFH wake-up pulse. This wake-up pulse can also be encoded, in order to only activate an authorized transmitter.

Further there can be imagined, also in any combination with the above aspects, devices for the communication of the battery state to the user:

Transmission of a signal concerning the battery state—for example a particular bit, if the battery is almost empty—to the receiver, thus over the capacitive resistive communications link. For example this occurs as a bit or sequence of bits of the data to be transmitted that is/are set to correspond to the battery state. By means of this, it can then be effected that the information is conveyed to the user and/or another entity (control center, etc.), for example through an output device such as a display or an acoustic signal.

Display of the battery state via an appropriate display feature of the portable device, for example at least an LED. Such an LED can blink, if the battery is nearly dead.

Provision for a "Low Comfort Mode" in which the transmitter electronics are inactive by default and must be actively activated, for example, by pressing a button. After the activation it can be imagined that after a particular time the transmitter electronics automatically return to an inactive state. It can be imagined that the "Low Comfort Mode" is first engaged after a second, lower voltage threshold is crossed, while crossing a first, higher voltage threshold would only result in the activation of appropriate notifications (for example according to at least one of the above aspects).

According to each of the aspects of the invention, it is particularly preferred that an information transmission method be used which relies on the spread spectrum method wherein the signal is transmitted as an ultra-broadband signal, preferably according to the teaching of the international patent application WO 2007/112609. Thereby, on the one hand, the energy requirement is kept low, and on the other hand the limited voltages and currents that occur are better accepted. Ultra-broadband is defined as the use of a frequency range of a bandwidth of at least 20% of the center frequency or, as the case may be, carrier frequency. According to the teaching of this document in particular a direct sequence spread spectrum is used. The data are preferably first modulated with a method of digital data modulation and subsequently spectrum-spread. In WO 2007/112609, methods are also described for the analysis of a capacitive resistive signal.

BRIEF DESCRIPTION OF THE DRAWINGS

In the following, embodiments of the invention are illustrated by means of schematic figures. Shown are.

DETAILED DESCRIPTION OF THE INVENTION

Figure 1:
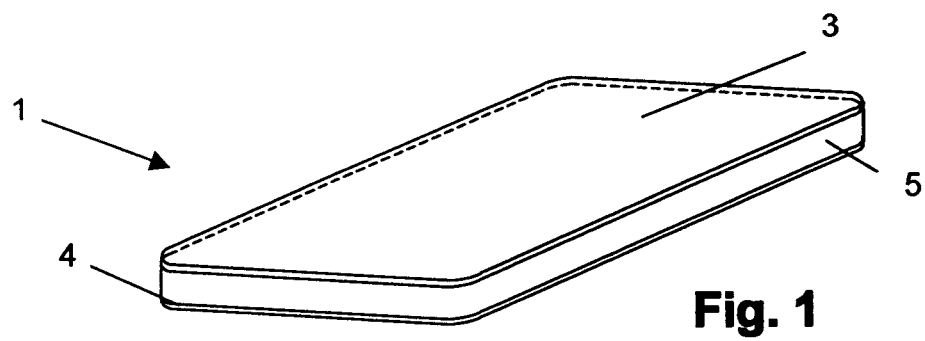
FIG. 1 is a depiction of a transmitter according to the invention.

The portable device 1 according to FIG. 1 is in the depicted example designed in substantially a card shape and comprises a first electrode 3 and a second electrode 4. Between the first and the second electrode are arranged further elements, for example a plastic carrier 5 with integrated and/or applied electronic component parts and a battery compartment (not depicted in the figure). The integrated and/or applied electronic component parts can, for example, include the ASIC for control of the electrodes, an EEPROM memory, conductive pathways and/or further elements. Rather than plastic, the carrier can be of ceramic or of a different material, the important factor is simply that the two electrodes are electrically isolated from one another.

At least one of the electrodes can be at least partially transparent, in the depicted example, the first electrode 3. On an upper side of the plastic carrier 5, letters, pictures, etc. can be applied by known means such that they are visible through the transparent electrode.

Figure 2:
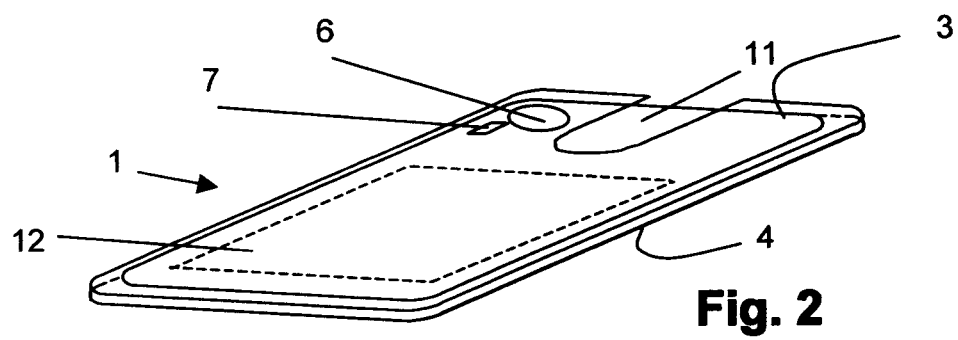
FIG. 2 is a depiction of a transmitter according to the invention with an inserted smart card of a further application.

FIG. 2 depicts a further illustrative example. The transmitter 1 is designed as a so-called "smart card cover". Smart card covers are known. They are designed as, for example, rigid, transparent shells, which for example can be attached to a piece of clothing and in which a smart card (i.e. a card-shaped medium with memory and communication functionalities) is able to be inserted.

The transmitter comprises a compartment for a battery 6 as well as control electronics, represented schematically by a chip 7, for the at least partially transparent electrodes 3, 4. The smart card 11 is able to be inserted into an air gap. A possible inscription area 12 of the smart card remains visible behind the transparent first electrode 3.

Figure 3:
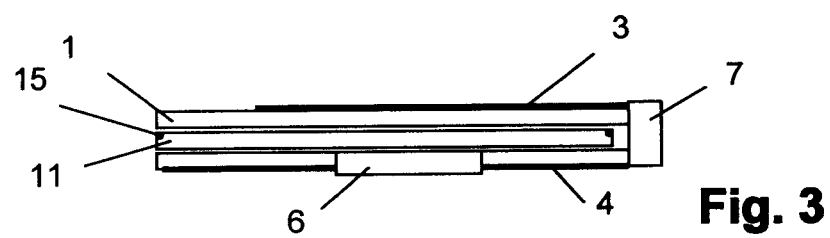
FIG. 3 is a sectional view of a transmitter with smart card.

FIG. 3 depicts a variant of the embodiment of FIG. 2, in which the smart card (or as the case may be other component part of an application that is distinct from the transmitter electronics) simultaneously serves as an RFID identification medium. In addition to the elements already described, one sees schematically the RFID antenna 15, which here is not completely covered by one of the electrodes—in the depicted example by the transparent electrode 3. It has however been shown that in cases of transparent electrodes—for example electrodes made of ITO—the RFID communication also functions if, differently than is shown in the figure, both transparent electrodes completely cover the RFID antenna 15, i.e. if the transparent electrode 3 covers the entire upper surface shown in the figure.

Figure 4:
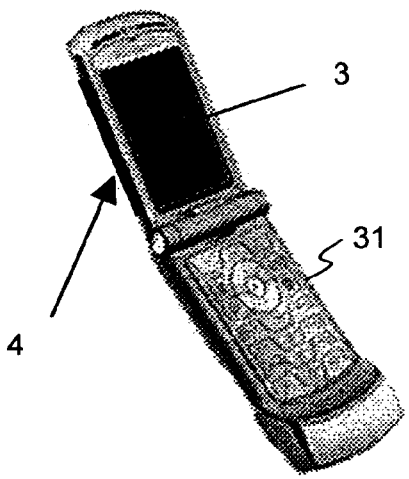
FIG. 4 is a mobile telephone in a form according to the invention.
Figure 5:
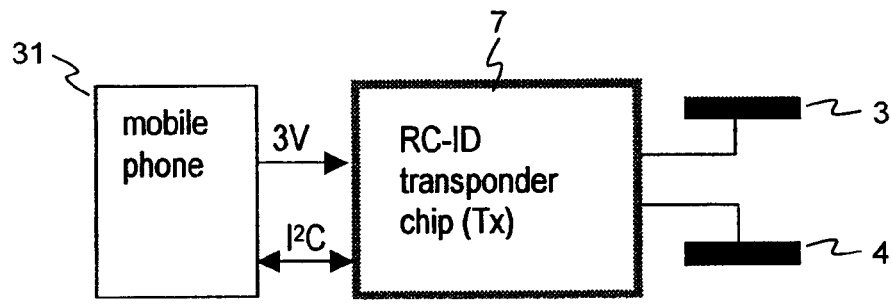
FIG. 5 is a schematic of the mobile telephone from FIG. 4.

FIGS. 4 and 5 relate to a portable device according to the invention that is designed as a mobile telephone 31. The first electrode 3 is integrated into the display and is at least in the area of the display transparent, while the second electrode 4, as in the previous examples of transmitter electrodes, is not necessarily transparent. The second electrode is situated on a reverse side of the mobile telephone (or rather as in the depicted example on the clamshell lid or on a different part of the mobile telephone) and can, as the case may be, also be formed by a conductive section of the housing. It is arranged at as large a fixed distance away from the first electrode as possible. In FIG. 5, it is very schematically depicted how the transmitter electronics 7 can be in connection with the remaining mobile telephone electronics: the mobile telephone energizes the transmitter electronics (3V), and a communication link exists over a I²C interface.

Through the integration of the transmitter electronics 7 in a mobile telephone and the allowance for an interface as per a preferred embodiment of the invention, several functionalities can be integrated together with one another in one portable device. The following are, for example, possible:

Dynamic alteration of the capacitive resistive transmitted data signals. The active data signal can for example be used as a PIN code, which can be altered arbitrarily often.

Increased security can be made possible, for example through so-called "rolling codes" or other known means of secure data transmission.

An even further increased level of security can be achieved as the UHF transmission means of mobile telephones (Bluetooth, 3G et.) is included in the information transmission procedure, for example as a downlink. This makes possible, for example, the use of known "challenge-response" systems. A central unit can also be included into communication and for example issue certificates (Cerberus etc.).

The mobile telephone with the transmitter electronics can be used as a programming device. A continuous data stream can be sent to the receiver with the help of the transmitter electronics.

Future mobile telephones will perhaps be furnished with NFC, RFID- or low-power-wireless (for example as distributed under the brand name wibree™ www.wibree.com)) or Ultra Low Power Bluetooth or other standards of identification. Through the use of the capacitive resistive information transmission such an identification technology can be integrated into a single device, and the user must not necessarily know which technology is in actuality used. Particularly interesting is the combination of the advancement according to the invention with other things, because, for example, the selective capacitive resistive information transmission follows a short-range (<10 m) contactless nonselective information transmission, and can work together with this.

Transmitter electronics for a mobile telephone can be designed according to standard dimensions and may be integrated in existing mobile telephone architecture without further ado.

According to a further aspect of the invention the control of the transmitter electrodes is furnished with a charge-recovery and/or adiabatic switching logic. Also, as previously described, the electrodes are spaced as widely as possible from one another, and the dielectric constant of the medium (s) between the electrodes is as small as possible.

Figure 6:
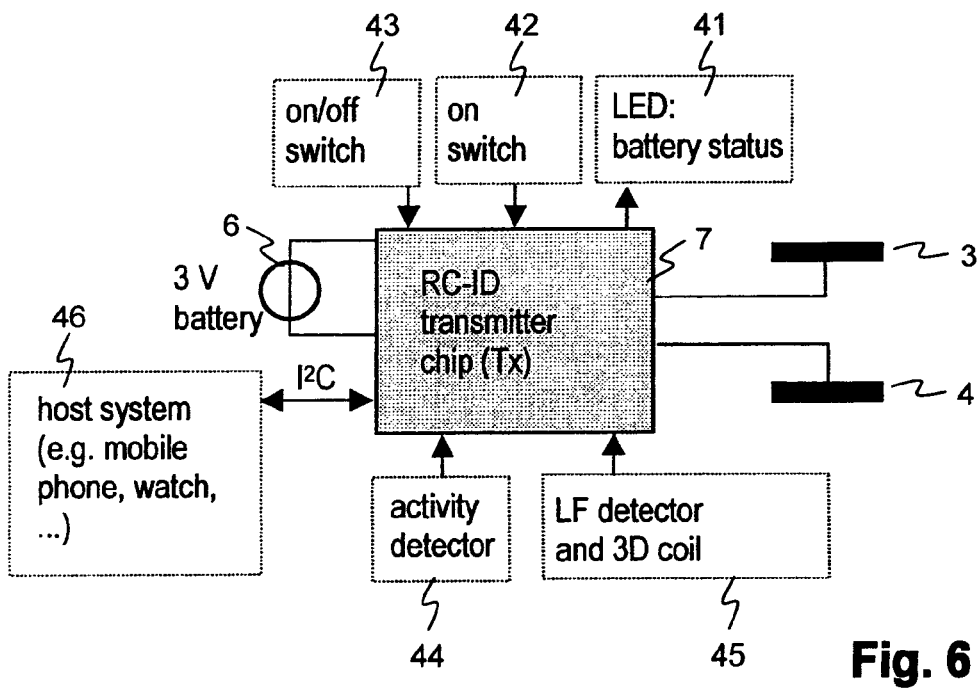
FIG. 6 is a schematic of a transmitter with possible in- and output units.

When, as according to FIG. 5, the transmitter electronics 7 are integrated into a portable device, or at least intermittently can communicate with such a device, the same transmitter electronics are, as according to FIG. 6, configured for a "stand alone" operation with additional in/output elements. The I²C interface that is shown in FIG. 6 is in a "stand alone" operation only intermittently connected with a host system 46, for example in order to configure the transmitter electronics 7.

Still further aspects which are associated with as small a power consumption as possible and/or the monitoring of the battery charge will be described with reference to FIG. 6. The components that are depicted in dotted boxes in the figure are optional and can be present singly or in combination.

The transmitter electronics 7 according to FIG. 6 are connected with an output unit 41, which makes a status message of the battery charge possible. Such a one can comprise a light emitting diode (LED) or many light emitting diodes 41. Furthermore an activity detector 44 can be present, which turns off the electrode controls if the portable device 31 or a carrier of the transponder chip 7, for example a key or a card, is not moved.

As an alternative, or possibly as a replacement thereof, it can also be imagined that the transmitter electronics are only active if a wake up signal, for example an LF (low frequency) wake up signal, is detected. A corresponding detection unit is indicated by the reference numeral 45. Configurations with LF detectors for the starting-up of a circuit are already known.

In the figure, an on switch 42 is depicted. Such a one can, for example, be employed if the electronics have been automatically shut off in a "low comfort mode" because of a nearly-empty battery. Through actuation of the switch 42, the electronics are again activated for a limited time. Also depicted is an on-off switch, through which the whole portable device can be turned off if it is not needed. In the case of a connection to a "host system" 46 (for example a mobile telephone 31) the management of power consumption is possibly somewhat less important.

The "turning-off of the electronics" does not preclude that individual components remain active, for example the internal clock. By "turning-off", it is expressly meant that the transition into such a partially active "sleep" mode occurs. In particular, in such a sleep mode the sending of signals over the electrodes is interrupted.

Figure 7:
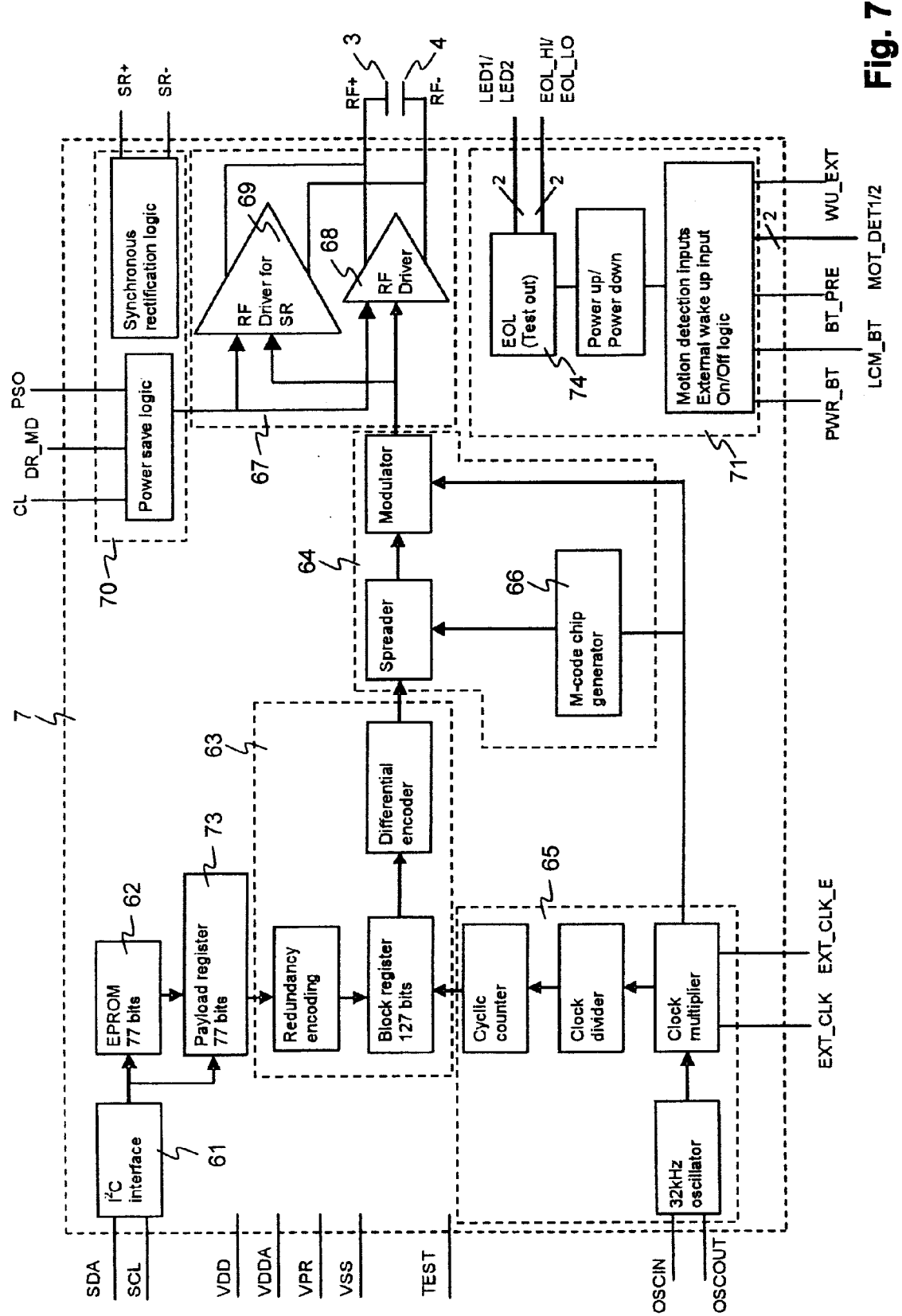
FIG. 7 is an inner structure of transmitter electronics.

FIG. 7 depicts the inner structure of transmitter electronics 7 with respect to an ASIC in a preferred embodiment of the invention. The ASIC comprises as main elements a communications interface 61 to an I²C bus with conductors SDA and SCL, a non-volatile memory 62, an encoder 63, a modulator 64, and output drivers 67. Preferably it additionally comprises a timing circuit 65, a control logic 70 for the output drivers 67 and a power conservation logic 71. The output drivers 67 preferably comprise different output drivers 68, 69, from which a particular driver can be chosen to correspond to the properties of the used electrodes. The modulator 64 comprises a chip generator 66, typically a "linear feedback shift register" (LFSR).

The function of the individual elements is as follows: data to be transmitted in the transmitter electronics 7 are readable over the communication interface 61, and control and operating parameters of the transmitter electronics 7 are adjustable (for example the length and the parameters of the LFSR). The data to be transmitted can be stored in non-volatile memory 62, such that the transmitter electronics 7 subsequently are decoupled from the interface and can operate autonomously. The data to be transmitted however can also be written into a payload register 73 and subsequently be over-written by further data from the communication interface 61. The data in the payload register are encoded, modulated and sent so long as a send operation of the transmitter electronics 7 is active.

For encoding, the encoder 63 comprises in a known way a unit for the adding-up of redundant correction bits, and for example a differential encoder. The code produced in such a way is preferably modulated to ultra broadband by the modulator 64. In a known way this occurs, for example, by means of a pseudo-random chip sequence. Each bit of the code to be transmitted is also in a time period multiplied or XOR-linked with one of many bits of a corresponding chip, whereby the broadband modulated signal results.

In the modulator 64, or adjoining thereto, a further element can be present, with which the bandwidth can be varied. This can, for example, be designed as a frequency splitter (e.g. flip flop), where depending on the setting, the signal transmission occurs with full bandwidth or with reduced bandwidth, for example with the half-bandwidth.

In a preferred embodiment of the invention the transmitter electronics 7 are designed such that the length of the chip sequence is specified or selectable, for example through the transfer of corresponding parameters over the interface 61. Thereby, it is possible to regulate the mutually opposed requirements with respect to the communication security and speed, corresponding to the application.

Further it is possible, through variations in the setting of the clock multiplier to configure the center frequency (carrier frequency) of the transmission—quasi through a scaling of all frequencies. Thus the robustness of the data transmission is also optimized in the presence of disturbances. It can, for example, be imagined that through a switch or a plurality of switches the center frequency can be switched between discrete values or quasi-continuously, or that as the case may be a specification for the center frequency can be made as a numerically-valued parameter over the interface and stored in a corresponding memory. The switch state(s) of the switch (es) can as the case may be further be defined via the interface, or they can, in particular if no interface is present—for example in the manner of DIP-switches—be externally accessible to a user or they can be ready-defined during the production of the portable device.

Particularly cost-effective is the combination of the possibility of varying the center frequency between at least two values or continuously, and the possibility of further varying the bandwidth between two values, or continuously. Thereby, possible interfering signals can be responded to particularly effectively.

The control logic 70 for the output driver 67 determines the output drivers 68, 69 to be used, for example in the following manner: with a control signal CL the magnitude of the capacitive load of the electrodes 3, 4 is selectable. With a control signal DR_MD it is selectable whether the electrodes are controlled differentially or single-endedly. With a control signal PSO, it is selectable whether the electrodes are controlled by means of "synchronous rectification" (wherein an external wiring by means of one or two inductors is necessary). By means of these control signals, the output drivers 67 and their method of operation are adapted to the used electrodes 3, 4 such that their energy needs remain as small as possible.

The power conservation logic 71 comprises, among other things, the detection of the battery state 74 and preferably the following inputs:
PWR_BT and BT_PRE for the turning-on and turning-off of various stages of a power saving operation;
LCM_BT for the activation of the sending-out of signals over the electrodes 3, 4 (for example during a specified time) if the transmitter electronics 7 themselves are in "low comfort mode";
MOT_DET1/2 for at least one movement detector or activity detector (44); and
WU_EXT for an external, in particular wirelessly received wake up signal ("Wake up") for example by a 125 kHz receiver. Thereby it can be achieved that the transmitter electronics 7 are only activated when in the proximity of a receiver. For this purpose the receiver, which for example is stationary or built into an automobile, is equipped with a corresponding 125 kHz sender for the sending-out of a wake up signal.
Output signals LED1, LED2 control LEDs for notification of the battery status. Output signals EOL_HI, EOL_LO further denote the battery level and can be, for example by the portable device 31, queried and processed.

Figure 8:
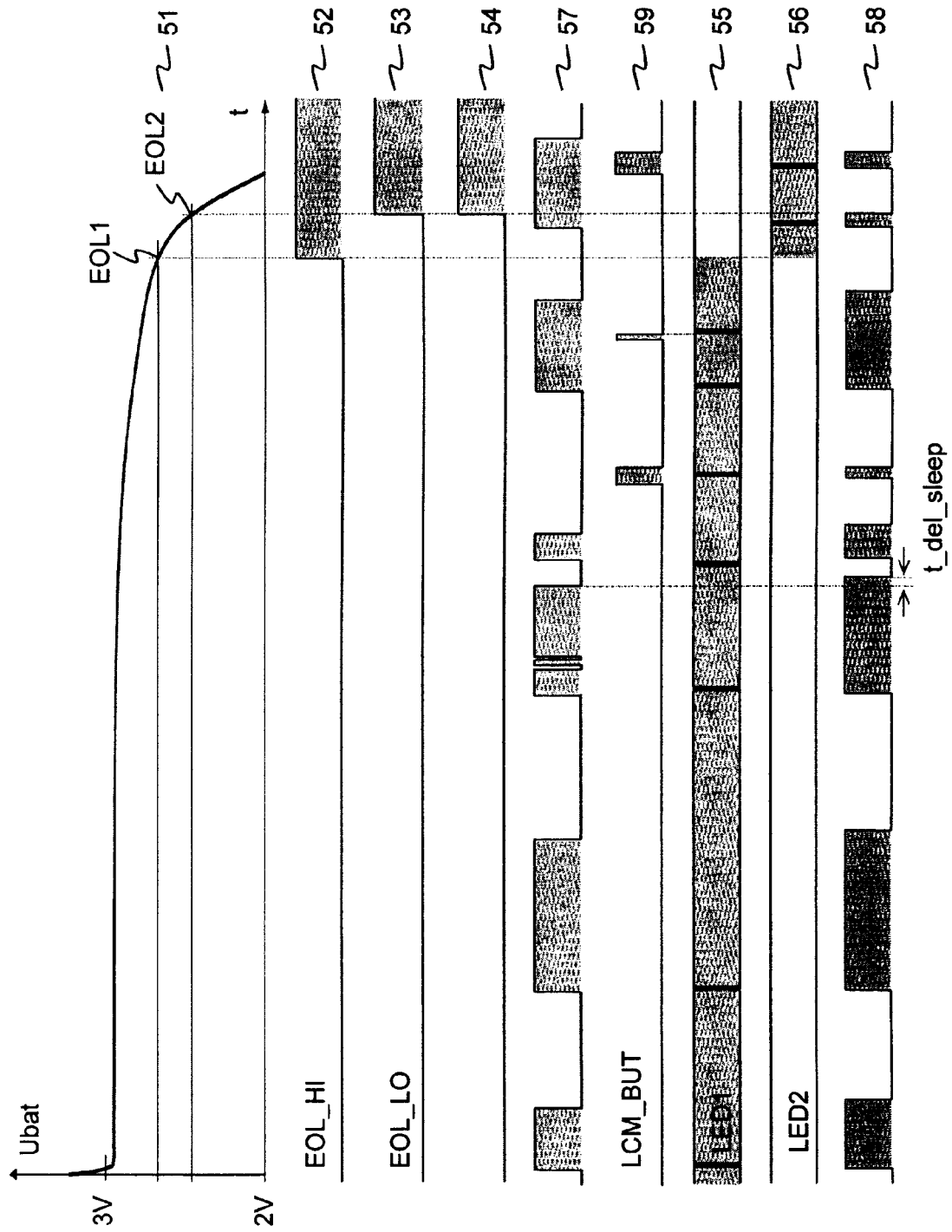
FIG. 8 is a depiction of a possible "end of battery life" management in a transmitter.

Finally, in FIG. 8 a further possible embodiment of an "end of battery life" characteristic is depicted. In the figure, one can see a typical discharge curve 51 of a lithium ion battery and in relation thereto:
the area for the normal operation and with depictions of the normal charge level, in which the first "end of life" signal EOL_HI (line No. 52) is low until the level drops below a first voltage threshold EOL1, and
the same area for the normal operation, in which the second "end of life" signal EOL_LO (No. 53) is low until the level drops below a second voltage threshold EOL2.

In lines 55 and 56 are shown a corresponding representation of light modes: while the EOL_HI is low, a first LED is lit or blinks with a particular pattern, after the level falls below EO1, the second LED blinks with a particular pattern. Line 54 depicts the activation of "low comfort mode range" 54, in which the portable device only enters active operation to send as a key is pressed (i.e. one must take it out of a bag/pocket).

Further it is depicted (line 58) in which time periods the electrodes are active, and thus send. This is the case in normal operation, if an activity sensor registers a movement of the portable device, or if a wake up signal is received (No. 57). If the movement stops, the electrodes preferably nevertheless remain active for a period of time t_del_sleep. In "low comfort mode", the electrodes are only active if the corresponding key is pressed (No. 59). At the farthest peak to the right on line 58 it is thus assumed that an active activation by a user occurs, corresponding to line 59.

The invention claimed is:

1. A portable device for transmitting signals to a second device to transmit data from the portable device to the second device, wherein the portable device is wearable by a user, the device comprising: at least two electrodes and
an output driver for applying an electrical signal between the electrodes such that the signal is able to be coupled into the body of the user by the electrodes and detected by at least one electrode of the second device,
wherein the portable device is capable of transmitting identification information,
wherein the mentioned output driver for applying the electrical signal between the electrodes is a part of transmitter electronics, which transmitter electronics is capable of generating the electrical signal dependent upon specified data, and wherein the transmitter electronics are implemented as an application-specific integrated circuit (ASIC), the application specific integrated circuit comprising:
a modulator for generating an electrical signal dependent upon specified data and
the output driver for applying the electrical signal between the electrodes,
the application-specific integrated circuit being designed for the end of communicating to the second device a signal concerning a battery charge level of a feed of the integrated circuit.

2. The portable device according to claim 1, wherein the integrated circuit further comprises:
an encoder for encoding the data to be transmitted and therewith for generating encoded data,
a modulator for modulating the encoded data and therewith for generating a modulated signal, and
a driver for amplifying the modulated signal and for driving the electrodes.

3. The portable device according to claim 1, wherein the integrated circuit further comprises a communications interface to further electronic component parts of the portable device.

4. The portable device according to claim 3, wherein the communications interface is an I2C interface.

5. The portable device according to claim 1, being designed to use a spread spectrum method for data transmission, wherein the signal is transmitted as an ultra-broadband signal.

6. The portable device according to claim 5, in which the range of a "chip" used for modulation in the spread spectrum method is selectable.

7. The portable device according to claim 1, in which a carrier frequency is selectable.

8. The portable device according to claim 1, in which the specified data are stored in a non-volatile memory of the integrated circuit.

9. The portable device according to claim 8, wherein the memory is an EEPROM memory.

10. The portable device according claim 1, in which the specified data are transmittable according to the following transmission mode:
   repeat transmission of the same set of the specified data, wherein this set of the specified data is stored in a non-volatile memory of the integrated circuit.

11. The portable device according to claim 1, comprising a circuit for detecting at least one battery state of a feed of the integrated circuit and for adjusting an operating condition of the integrated circuit according to the battery state.

12. The portable device according to claim 1, further comprising a "low comfort mode" in which the transmitter electronics are inactive by default and must be actively activated, for example by pressing a button.

13. The portable device according to claim 1, further comprising an interface to an activity detector, whereby a sending-out of the signal is stopped, as soon as the portable device is not moved for a specified time, and the sending-out of the signal is resumed again if the portable device is moved.

14. The portable device according to claim 1, further comprising a charge recovery logic or an adiabatic switching logic for controlling the electrodes.

15. The portable device according to claim 1, further comprising at least two different output drivers for energizing the electrodes and a control logic for selecting one of the output drivers according to the requirements of the type of electrodes used.

16. The portable device according to claim 1, in which a signal bandwidth is selectable.

17. The portable device according claim 1, in which the specified data are transmittable according to the following transmission mode:
   repeat transmission of the same set of the specified data, wherein this set of the specified data is able to be altered over a communications interface of the integrated circuit.

18. The portable device according claim 1, in which the specified data are transmittable according to the following transmission mode:
   transmission of variable sets of the specified data, wherein these sets of specified data are able to be specified over the communications interface of the integrated circuit.

* * * * *